United States Patent [19]

Hsien et al.

[11] Patent Number: 5,561,946
[45] Date of Patent: Oct. 8, 1996

[54] CULTURE VASE

[76] Inventors: Ching-chi Hsien; Yeh Shen-lei; Lai S. Yen, all of 7F-2, No. 95-8 Chang Ping Road Sec. 1, Taichung, Taiwan

[21] Appl. No.: 526,672

[22] Filed: Sep. 12, 1995

[51] Int. Cl.$^6$ ..................................................... A01G 9/14
[52] U.S. Cl. ..................................................... 47/69; 47/60
[58] Field of Search ........................... 47/69 T, 60 NL, 47/60 R

[56] References Cited

U.S. PATENT DOCUMENTS

| | | | |
|---|---|---|---|
| 3,242,614 | 3/1966 | Thompson | 47/69 T |
| 3,995,396 | 12/1976 | Spector | 47/69 |
| 4,670,398 | 6/1987 | Song | 47/69 T |
| 5,094,033 | 3/1992 | Drew | 47/69 |
| 5,375,372 | 12/1994 | Lee et al. | 47/69 |

Primary Examiner—Terry Lee Melius
Assistant Examiner—Joanne C. Downs

[57] ABSTRACT

A culture vase comprises generally a transparent cylindrical body having an introversively spherical portion on the top and a less diameter opening on the bottom, a culture seat disposed into the opening and a cover having threads thereon coupled to a neck of the opening. Furthermore, both of the culture seat and the cover have at least an air inlet thereon in cooperation with a circular filter disposed therein-between, thereby, permitting the entrance of the fresh air and preventing the germs or bacteria from entering into the cultured explant.

4 Claims, 3 Drawing Sheets

CULTURE VASE

BACKGROUND OF THE INVENTION

The present invention relates to botanic culture containers, more particularly to a structure of culture vase which provides an easy disposal and removal of explant, vegetable seeds and the like from therein and facilitates easier cleaning and sterilizing work in a laboratory.

The explant and/or the vegetable seeds are usually cultured including or excluding from bacteria depending upon the variety of flora and the requirements thereof. If the explant for example is cultured excluding from bacteria, it must be processed inside a container so as to isolate the species from ambient circumstance and keep it from being affected with bacteria and/or germs.

Currently, conical flask (as shown in FIG. 1) is used as a culture container in which the explant or the vegetable seed is cultured. The culture is disposed on the big bottom of the flask and the flask will be heated and pressurized or chemically sterilized before the disposal of the explant therein. The opening on the top of the flask is blocked by means of a cork stopper, in the center of which is a cotton strip adapted to permit the entrance of the external fresh air and to prevent the flask from bursting because of the variation of the temperature and the light that expands the air therein. A small piece of thin plastic sheet sometimes bound upon the cork stopper for providing further protection to the explant inside the flask. However, such flask used as a container to culture the explant or the vegetable seed has numerous of disadvantages outlined as follows:

a) the opening on the top of the flask is too small and obstructs thoroughly sterilizing the bacteria or germs adhered to the inner wall thereof and hinders the disposal the culture as well as the explant therein, b) once a sprout germination inside the flask, it is also difficult to pick it, tip from the flask therein except breaking the flask up to transplant the sprout to another culture. This causes a waste of material c) the cork stopper shades partially the light on the explant inside the flask that affects the growth of the sprout therein, and d) a friction coupling of the cork stopper into the opening of the flask will be loosened because of the variation of the ambient temperature causing the stopper to expand and contract, therefore, inviting the external germs or bacteria entering into the flask to undermine the life of the explant cultured.

SUMMARY OF THE PRESENT INVENTION

The main object of the present invention is to provide a structure of culture vase which has a broad interior space and wide opening for easily disposing and removing a culture or an explant from inside of the vase.

Another object of the present invention is to provide a structure of culture vase which is readily openable for facilitating a thorough sterilizing the interior of the vase.

Still another object of the present invention is to provide a structure of culture vase which provides sufficient light on the explant.

A further object of the present invention is to provide a structure of culture vase which can be used repeatedly in order to be less expensive to the culture process.

Accordingly, the culture vase of the present invention comprises generally a cylindrical body, a culture seat and a cover.

The body which is made from transparent material has an introversively spherical top, an opening on the bottom having a diameter slightly less than that of the body, a lateral flange and a threaded neck directly extended from the rim of the opening.

The culture seat has a tubular body diametrically less than the inner diameter of the opening, a flange laterally extended from the bottom thereof, and diametrically larger than the inner diameter of the opening, and a pair of the first air inlets on opposite sides of the flange respectively.

The cover has a second air inlet at a center and a threaded inner periphery of an enclosed wall inner periphery made in registry with the threaded outer periphery of the neck of the body. So that the culture seat can insert into the opening and the cover can tightly engage with the neck of the body.

A circular filter of a larger diameter than that of the second air inlet is provided to cushion between the seat and the cover for preventing bacteria or germs from entering into the vase.

The present invention will become more fully understood by reference to the following detailed description thereof when read in conjunction with the attached drawings.

DETAILED DESCRIPTION OF THE PREFERRED EMBODIMENT

Figure 1:
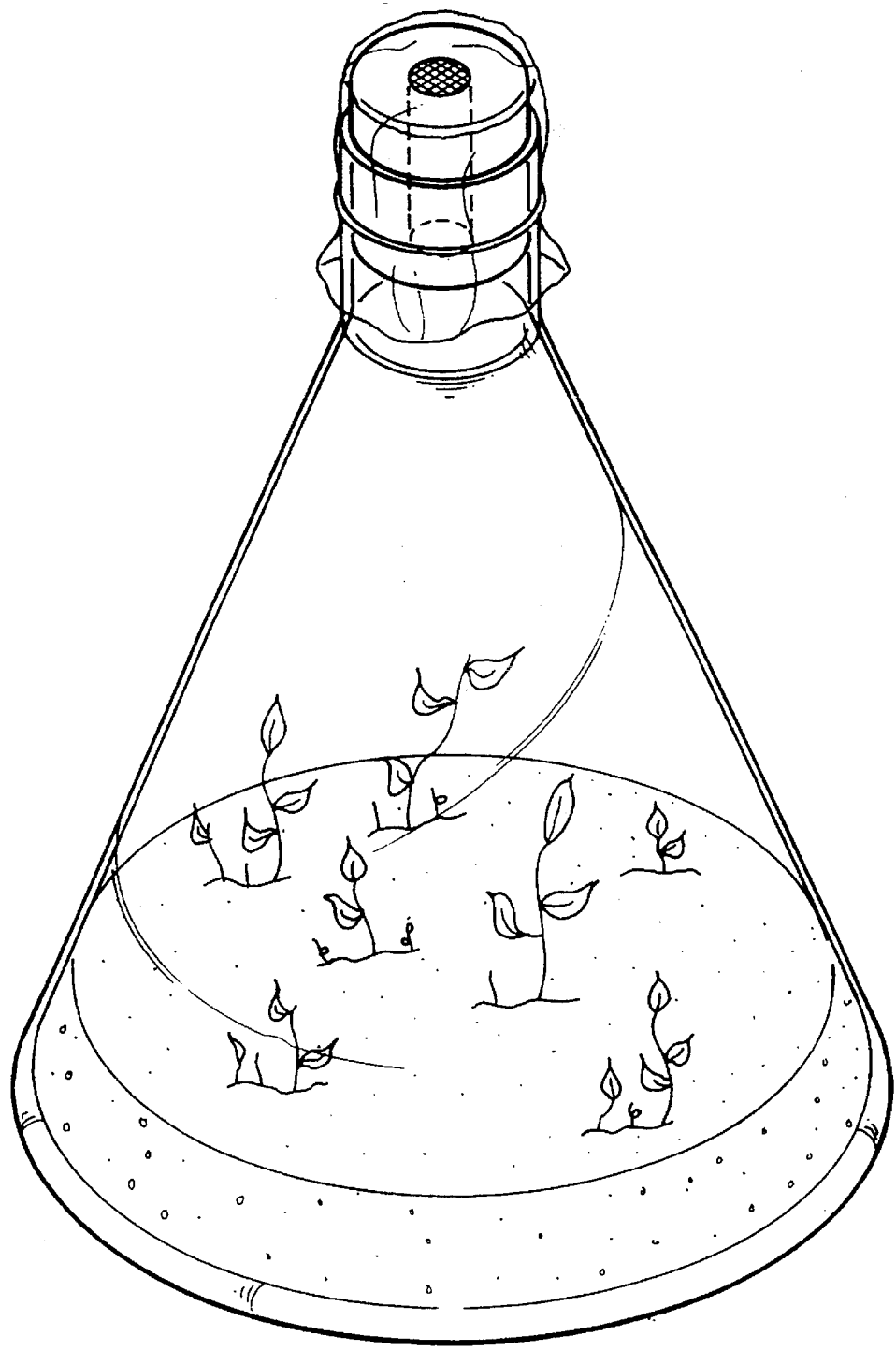
FIG. 1 is a perspective view to show a flask of prior art adapted to culture process.
Figure 2:
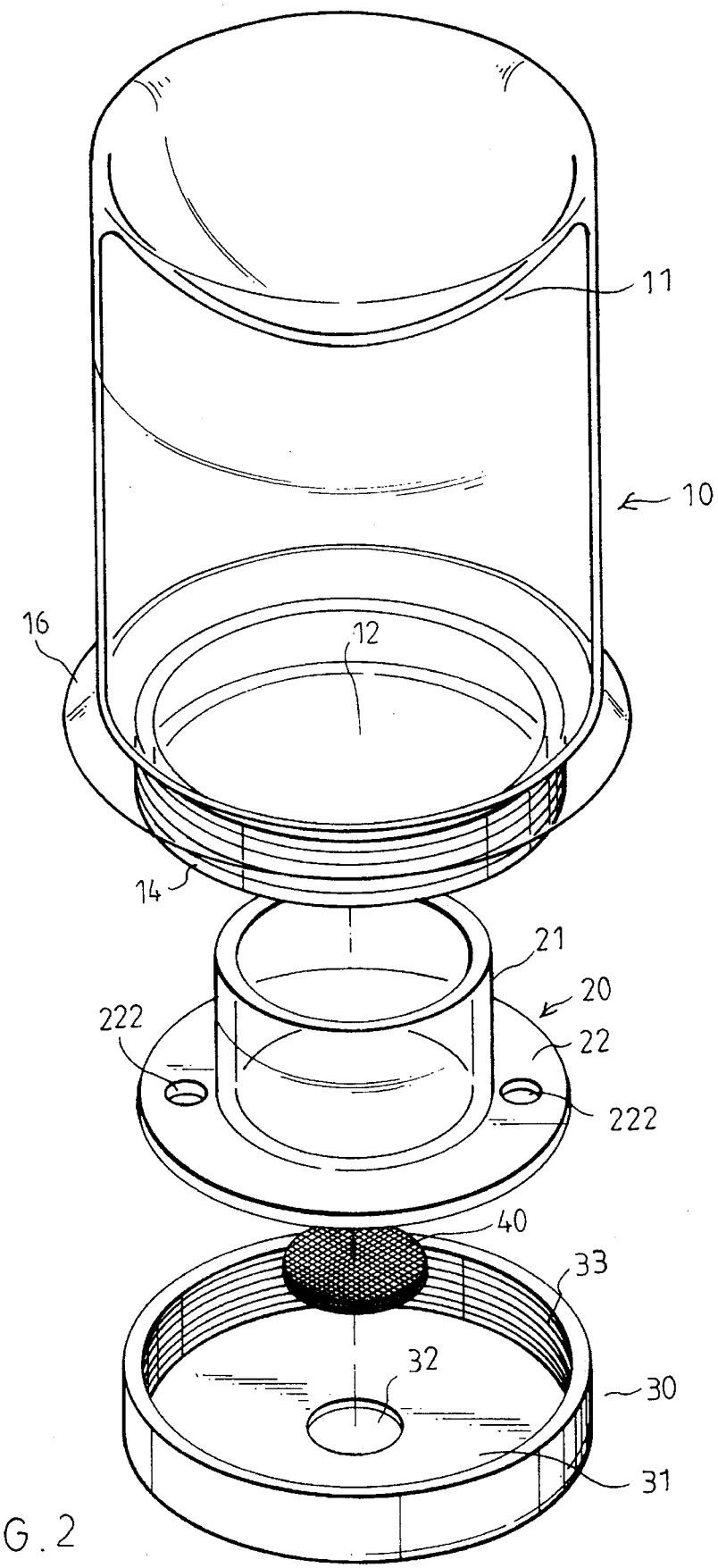
FIG. 2 is an exploded perspective view to show a preferred embodiment according to the present invention.

With reference to FIG. 2 of the drawings, the culture vase of the present invention comprises gerenally a cylindrical body 10, a culture seat 20 and cover 30, wherein the body 10 which is made from transparent material has a introversively spherical portion 11 on the top and an opening 12 on the bottom thereof. The opening 12 has a diameter less than that of the body 10, a circular neck 14 of a threaded outer periphery extended downward and a lateral flange 16 extended outward from the rim of the opening 12 respectively. The culture seat 20 has a tubular body 21 having a diameter less than the inner diameter of the opening 12 and a lateral flange 22 which extends outward from the bottom of the body 21 having a pair of first air inlets 222 formed on opposite sides of the flange 22 respectively. The flange 22 has a diameter larger than that of the opening 12. The cover 30 has a circular body 31, a second air inlet 32 formed at a center of the body 31 and an enclosed wall 33 projected upward from the circumference of the body 31 having threaded inner periphery made in registry with the threaded outer periphery of the neck 14. A circular filter 40 which is made from densely woven material is provided to block out the second air inlet 32 for preventing the external germs or bacteria from entering into the culture vase and permitting the entrance of the fresh air.

Figure 3:
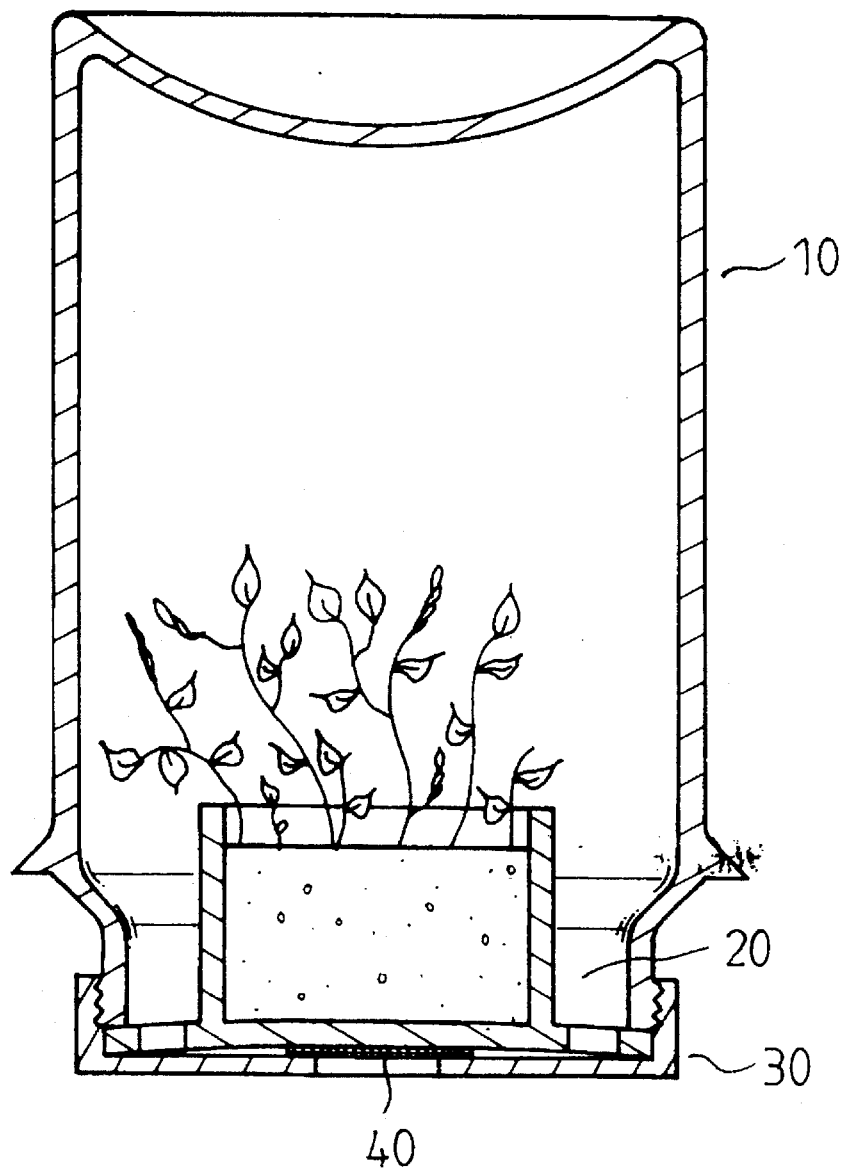
FIG. 3 is an elevational section of FIG. 2 in which the cultured explant grows prosperously.

Referring to FIG. 3, when applying, sterilize the culture vase thoroughly at first and dispose the culture into the culture seat 20 before the allocation of the explant or vegetable seed therein and then place the culture seat 20 into the cover 30 with the filter 40 cushioned thereinbetween and closed the second air inlet 32 of the cover 30. Finally, swing the cover 30 onto the neck 14 of the opening 12 until the upper surface of the flange 22 is abuting the rim of the neck 14 so that the culture vase is completely closed.

Based on the aforediscussed arrangement, if the culture vase of the present invention is disposed on a porous or corrugated surface, the filter 40 will permit the entrance of the fresh air into the vase via the first and second inlets 222 and 32 and prevent the germs or bacteria from entering into the vase therein. While, the introversively spherical portion 11 on the top of the body 10 will refract the light and cause a light scattering inside the vase, thus, the cultured explant therein receives averagely the light illumination. Further, the lateral flange 16 of the cylindrical body 10 will prevent the dirt from entering into the clearance at the rim of the cover 30.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An article for containing cultured explant and the like comprising:

a cylindrical body, said body having an introversively spherical portion on a top of said body, an opening having a diameter less than that of said body on a bottom thereof, a neck having a threaded outer periphery extending downward and a lateral flange extending outward from a rim of said opening respectively;

a culture seat disposed in said opening, said seat comprising a tubular body having an outer diameter slightly less than the inner diameter of said opening, a flange extending outward from a lower periphery of said culture seat and having a diameter slightly larger than that of a rim of said neck and at least a first air inlet formed on said flange;

a cover for receiving said culture seat and for coupling to said neck, said cover comprising a circular body having an inner diameter corresponding to an outer diameter of said neck said cover further having, at least a second air inlet at a center thereof and an enclosed wall projected upward from a circumference thereof having a threaded inner periphery made in registry with the threaded outer periphery of said neck, and a circular filter disposed on said at least a second air inlet between said culture seat, and said cover.

2. An article according to claim 1, wherein said cylindrical body of said culture vase is made from transparent material.

3. An article according claim 1, wherein said flange of said culture seat abuts the rim of said neck upon assembly.

4. An article according to claim 1, wherein said circular filter is made from densely woven material.

* * * * *